United States Patent Office 3,212,835
Patented Oct. 19, 1965

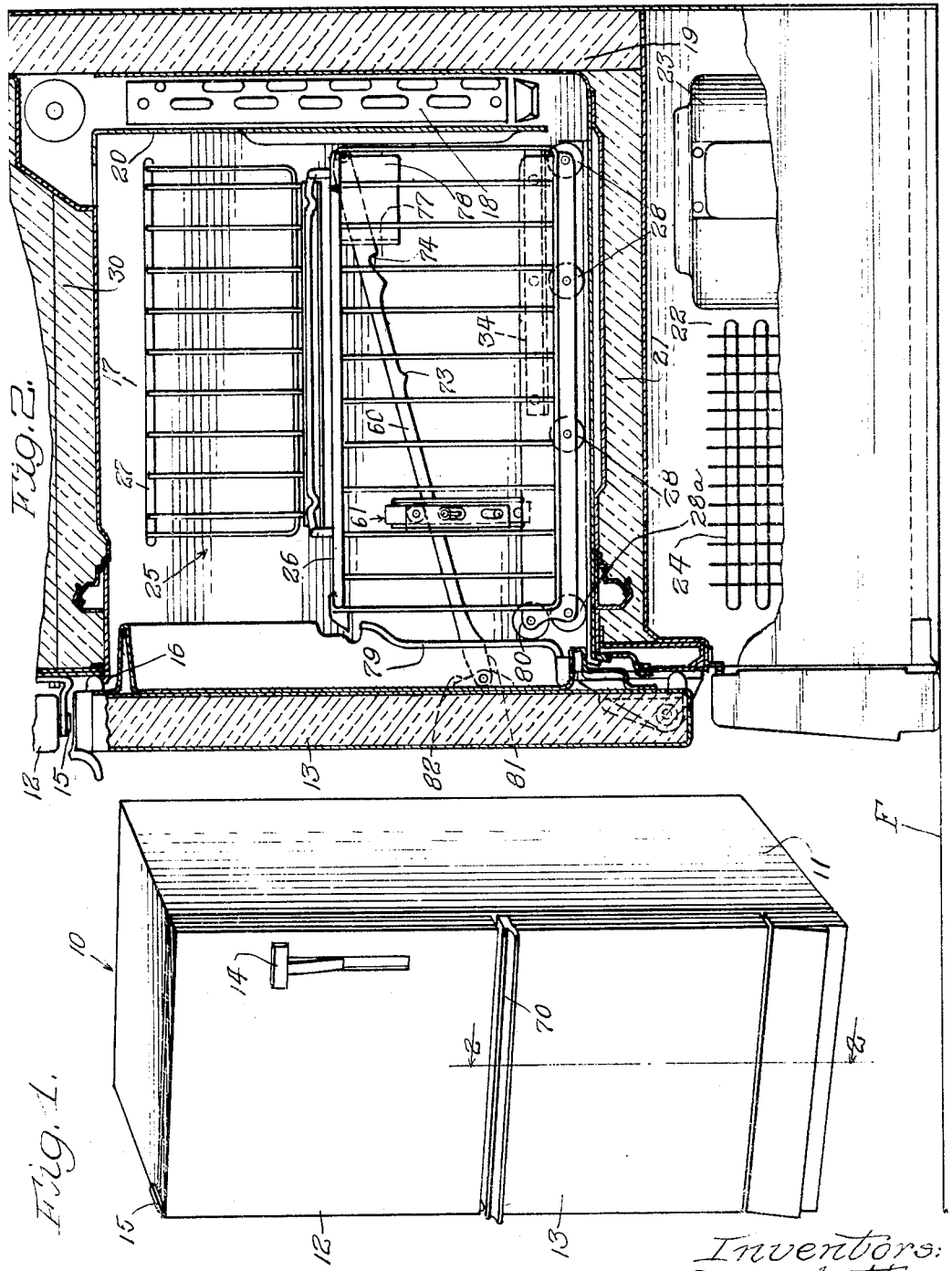

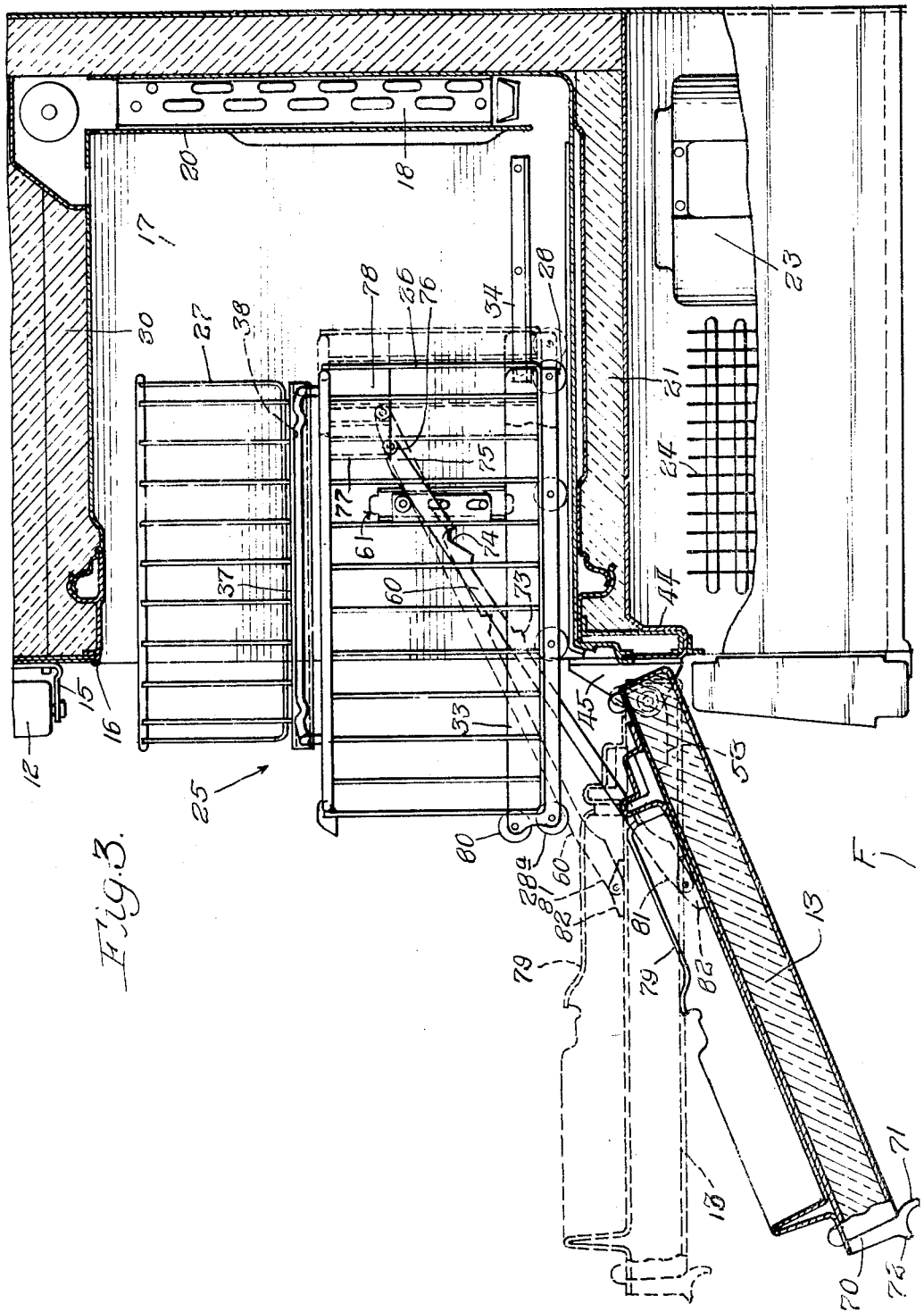

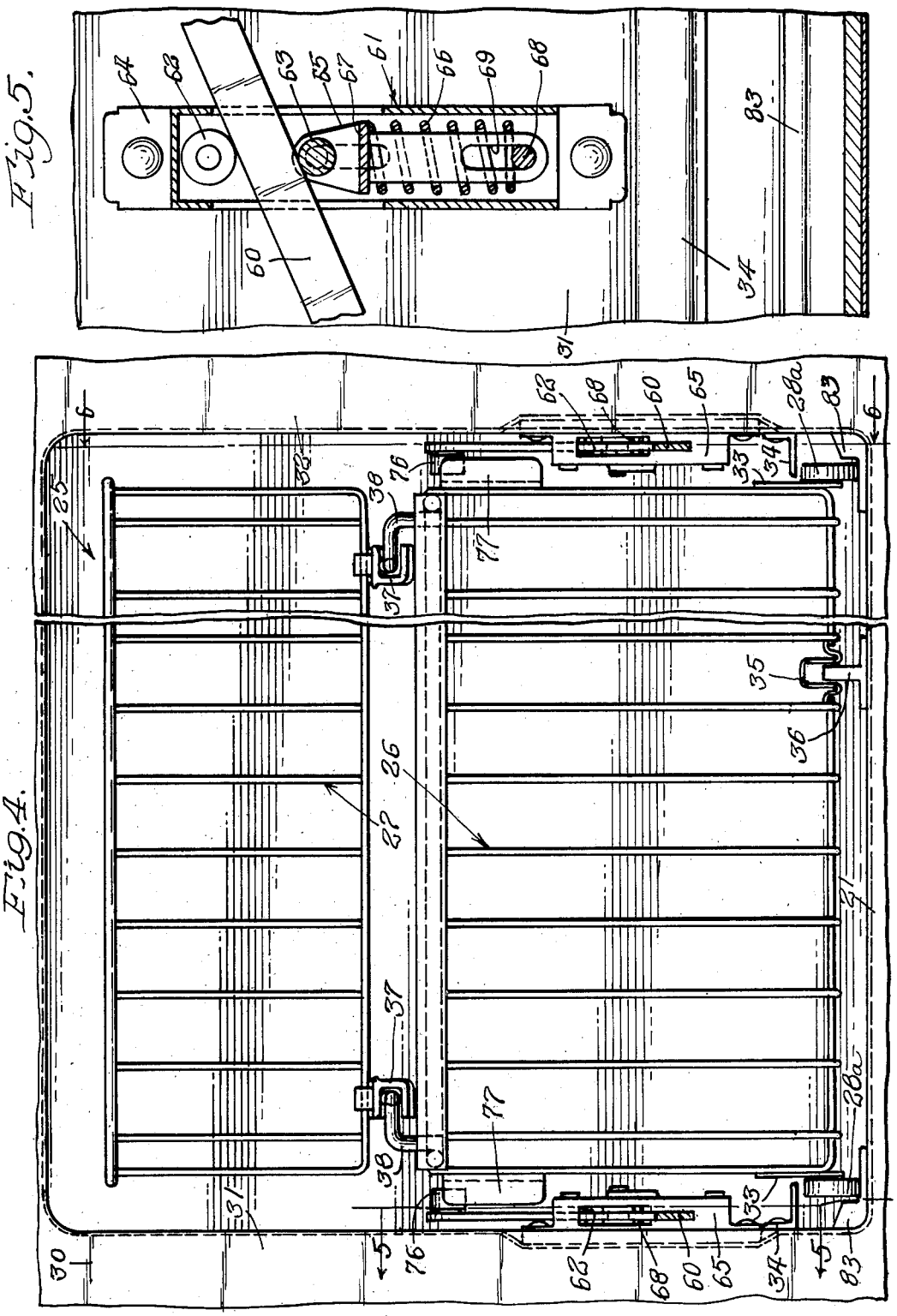

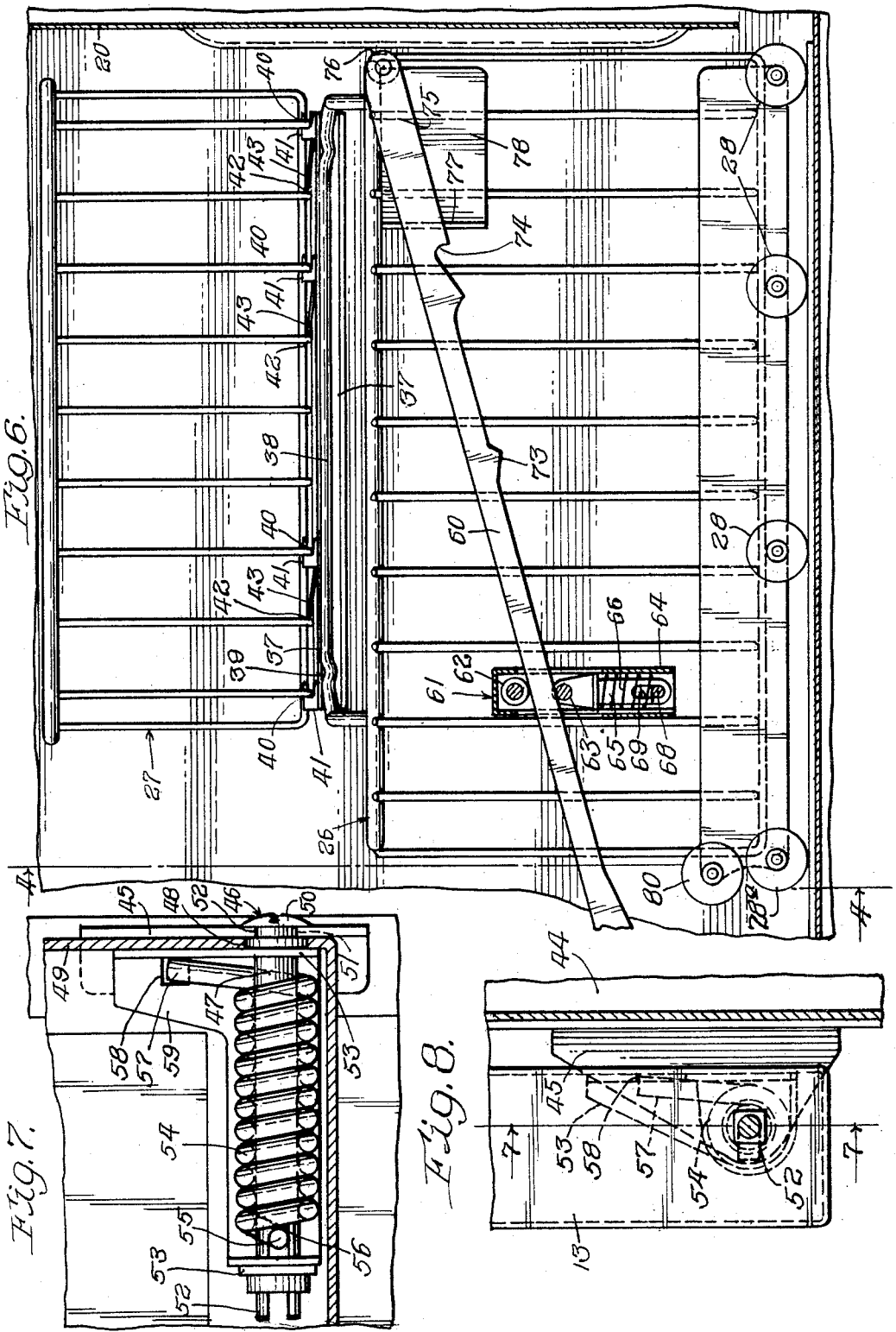

3,212,835
DROP DOWN CABINET DOOR AND ASSOCIATED REMOVABLE RECEPTACLE
Leo G. Beckett, Henderson, Ky., and Harold P. Peters, Evansville, Ind., assignors to Whirlpool Corporation, a corporation of Delaware
Filed Jan. 16, 1962, Ser. No. 166,588
13 Claims. (Cl. 312—311)

This invention relates to cabinet structures and in particular to cabinet structures such as for use in refrigerators.

In modern refrigerators, and in particular in the freezer sections of the modern refrigerators, it is highly desirable to provide facilitated accessibility both to the refrigerated chamber itself and to the items which may be stored therein. In one form of modern refrigerator, the freezer chamber is provided in the lower portion of the cabinet. Such disposition makes it relatively difficult for the user, such as the housewife, to obtain ready access to the freezer chamber and the items therein.

The present invention comprehends an improved cabinet structure wherein the door provided for selectively closing the lower refrigerated chamber is arranged to drop down rather than swing about a vertical axis as in the conventional refrigerators. Further, the present invention comprehends an improved arrangement whereby food storing receptacles, such as baskets disposed within the refrigerated chamber, are automatically brought forwardly to a readily accessible forward position as a concomitant action of the downward opening of the door.

Thus, a principal feature of the present invention is the provision of a new and improved cabinet structure.

Another feature of the invention is the provision of such a cabinet structure having a new and improved drop down type door means.

A further feature of the invention is the provision of such a cabinet structure having new and improved means for controlling the disposition of the door.

Still another feature of the invention is the provision of such a cabinet structure having a first means for moving the food storage baskets forwardly to a forward accessible position upon an opening of the door, and a second means for automatically restoring the food storage baskets to a fully inserted position upon a closing of the door.

A yet further feature of the invention is the provision of such a cabinet structure having new and improved means for movably carrying the receptacle means within the cabinet chamber.

A yet further feature of the invention is the provision of a receptacle means having new and improved means for associating a first receptacle with a subjacent receptacle.

Other features and advantages of the invention will be apparent from the following description taken in connection with the accompanying drawing wherein:

FIG. 1 is an isometric view of a cabinet, such as a refrigerator cabinet, having a door and receptacle structure embodying the invention;

FIG. 2 is an enlarged fragmentary vertical section thereof taken substantially along the line 2—2 of FIG. 1;

FIG. 3 is a fragmentary sectional view generally similar to that of FIG. 2 but with the door in the fully open position;

FIG. 4 is a transverse vertical section taken substantially along the line 4—4 of FIG. 6;

FIG. 5 is a fragmentary enlarged vertical section taken substantially along the line 5—5 of FIG. 4;

FIG. 6 is a fragmentary vertical section taken substantially along the line 6—6 of FIG. 4;

FIG. 7 is a fragmentary vertical section taken substantially along the line 7—7 of FIG. 8 and illustrating a portion of the door pivot means; and FIG. 8 is a fragmentary elevation illustrating the door pivot means.

In the exemplary embodiment of the invention as disclosed in the drawing, a cabinet 10, herein a refrigerator cabinet, is shown to include an insulated enclosure 11 and a pair of doors 12 and 13 for providing controlled access to the interior of the enclosure. Upper door 12 comprises a generally conventional door having a handle 14 for use in manipulating the door 12 on hinges 15 for pivotal movement about a vertical axis. The lower door 13 is arranged in a new and improved manner for pivotal movement about a horizontal axis at its lower end whereby the door 13 may be swung downwardly from the closed position of FIG. 1 to the fully open position of FIG. 3 wherein the distal end of the door may engage the floor F on which the cabinet 10 is placed. Thus, the door 13 provides selective closing of the front opening 16 of a chamber 17 comprising the lower refrigerated chamber of the cabinet 10. In the illustrated embodiment, chamber 17 comprises a freezer chamber brought to a subfreezing temperature by a suitable evaporator 18 disposed between the rear wall 19 of the cabinet enclosure 11 and a vertical evaporator baffle plate 20 defining the rear wall of the chamber 17. The bottom wall defining chamber 17 comprises an insulated wall 21 which further defines the upper wall of an equipment space 22 in which the motor compressor 23 and condenser 24 of the refrigerator are disposed in the conventional manner.

The invention further comprehends the provision within chamber 17 of an improved receptacle means generally designated 25 comprising a lower basket 26 and an upper basket 27 slidably carried on the lower basket. The lower basket is movably carried on the bottom wall 21 by means of a plurality of rollers 28 rolling on suitable track 83 on wall 21, and is connected to the door 13 by an improved connecting means 29 for automatic movement from a fully inserted position of FIG. 2 when the door 13 is in the vertical closed position across opening 16, to a forwardly disposed, accessible position when the door 13 is swung to the fully open position as shown in full lines in FIG. 3.

Freezer chamber 17 is upwardly defined by a horizontal wall 30 and is laterally defined by left side wall 31 and right side wall 32 of enclosure 11. As best seen in FIG. 4 the baskets 26 and 27 extend substantially fully across the chamber 17, and as shown in FIG. 2, basket 26 extends substantially fully from the rear to the front thereof while basket 27 is slightly shorter, being normally disposed above the rear portion of the lower basket 26. A pair of roller support plates 33 is provided at the bottom of the basket 26 at the opposite sides thereof, each of the support plates 33 carrying four rollers 28 as illustrated in FIG. 2. The receptacle assembly 25 is prevented from tipping forwardly and downwardly when it is moved forwardly from the rearward position of FIG. 2, such as to the forward positon of FIG. 3, by retaining guides 34 secured to the side walls 31 and 32 to overlie the rollers 28 in the rear portion of the chamber 17. The receptacle assembly 25 is guided forwardly and rearwardly by a guide channel 35 carried by the basket 26 and cooperating with an upright guide rail 36 carried on the bottom wall 21.

The upper basket 27 is provided with a pair of depending slides 37 slidably engaging upstanding slide arms 38 on the lower basket 26. The slide 37 and slide support 38 are provided with co-operating projection means 39 and detent means 40, respectively, for releasably retaining the upper basket in the rearmost position as shown in FIG. 6.

The slide 37 is retained on the bottom of basket 27 by the engagement of a number of cross wires 40 of the bottom of basket 27, herein four cross wires, with a plurality of rearwardly opening hooks 41, and the engagement of a number of cross wires 42 of the bottom of the basket 27, herein three cross wires, with a plurality of forwardly upwardly inclined spring fingers 43 carried by the slide 37. Thus, to install the slide on the basket 27, the hooks 41 are merely moved rearwardly to engage the wires 40 while the spring fingers 43 are resiliently depressed downwardly by the wires 42 until the wires 40 are fully received in the hooks 41 whereupon the distal ends of the spring fingers spring up to an aligned position behind the cross wires 42. Thus, the engagement of the hooks with cross wires 40 prevents further rearward movement of the slide relative to the basket 27 and the engagement of the fingers with the cross wires 42 prevents forward movement of the slide relative to the basket, effectively positively securing the slide 37 to the bottom of the basket.

As discussed briefly above, door 13 is arranged to pivot downwardly in providing access to chamber 17 and in so pivoting actuates mechanism 29 to effect the movement of the baskets from the rearward position of FIG. 2 to the extreme accessible position of FIG. 3. More specifically, door 13 is pivotally mounted on the front end 44 of the bottom wall 21 by means of a pair of hinge plates 45. A pivot post 46 is associated with each hinge plate 45 for pivotally mounting the door on the hinge plate, each hinge pin including a cylindrical portion 47 received within the door and extending through a hole 48 in the side wall 49 of the door. The outer end of the pivot post defines a head 50 disposed outwardly of the hinge plate 45. The hinge plate is provided with a square hole 51 and the pivot post is provided with a corresponding square portion 52 extending through hole 51 for preventing rotation of the pivot post on the hinge plate. The inner end 52 of the pivot post is bifurcated and is carried in a bracket 53 within the door. A coil spring 54 is disposed helically about the pivot post with one end 55 thereof received in the slot 56 of the bifurcated post end 52 and the other end 57 of the spring received in an opening 58 in a transverse portion 59 of the bracket 53. The bracket 53 is fixed to the door 13 and, thus, the spring 54 biases the door to the closed position as shown in FIG. 8. However, the spring is arranged so that the door may be readily pivoted fully downwardly to the fully open position of FIG. 3 against the action thereof.

The pivotal movement of door 13 is controlled by a pair of pivot links 60 having front portion 81 pivotally connected to a pair of brackets 82 fixed to the opposite sides of the rear of door 13. As seen in FIG. 2, each pivot link 60 has a length substantially equal to the depth of the chamber 17 and is provided with a first detent 73 and a second detent 74 between the first detent 73 and the rear end 75 of the link. As best seen in FIG. 5, each pivot link extends longitudinally through a catch assembly generally designated 61 having an upper guide roller 62 engaging the top of the link 60 and a lower guide roller 63 engaging the bottom of the link. The upper roller 62 is carried by a supporting bracket 64 of the catch assembly 61 for rotation about a fixed axis and the lower roller 63 is carried on a support 65 biased upwardly by a coil spring 66 which is compressed between a flange 67 on the support 65 and a rivet 68 secured to the bracket 64. The lower end of the support 65 is provided with a vertically elongated slot 69 permitting substantial vertical movement of the roller 63 urged against the lower edge of the link 60 by the spring 66.

A detent 73 is located on link 60 suitably for holding the door 13 in a preselected partially open position, herein at approximately 40° to the vertical closed position of FIG. 2. A second detent 74 is suitably located on the link 60 so as to hold the door 13 releasably in the horizontal position. Detent 74 comprises a cutout portion of the link 60 so as to engage the roller 63 relatively positively, thereby effectively precluding inadvertent dropping of the door from the horizontal position when it is desired to retain the door in the horizontal position. The back portion of the cut out which forms detent 74 is so shaped as to allow the roller 63 to override the detent when a weight substantially over that normally stored in the door is placed on the door whereby the door is free to move beyond the horizontal position to the solid line position of FIG. 3. Thus, the detents 73 and 74 effectively comprise latches and the roller 63 comprises a catch for co-operation therewith to retain the door releasably in the preselected positions.

As discussed briefly above, the receptacle means 25 is associated with the door 13 so as to be made readily accessible when the door is in the horizontal open position shown in dotted lines in FIG. 3 or in the fully open position shown in full lines in FIG. 3. More specifically, a roller bearing 76 is mounted on the rear end of each of the links 60 to engage an outturned flange 77 of a pair of brackets 78 mounted respectively at opposite sides of the basket 26. As best seen in FIGS. 2 and 6, when the door 13 is closed and the receptacle means 25 is fully inserted into the chamber 17, the roller bearing 76 is disposed substantially rearwardly of the flange 77. As the door 13 is opened, a lost motion movement of the roller bearing 76 occurs until such time as the roller bearing engages the flange 77. In the illustrated embodiment, this engagement occurs when the door reaches a position approximately 27° from the vertical closed position of FIG. 2. Subsequent further downward pivoting of the door 13 causes the roller bearing 76 to urge the flange 77 forwardly, thereby moving the receptacle means 25 forwardly to provide automatic accessibility to the baskets 26 and 27. The roller bearing 76 moves substantially horizontal during pivoting of the door from its 27° position to its 90° horizontal position. This horizontal movement of the roller bearing 76 when in contact with the flange 77 is desirable because all of the force imparted to the receptacle means is in the same direction as the receptacle is being guided, that is, horizontal, which means smooth, uninterrupted movement of the basket with a minimum of force required. By virtue of the novel arrangement of the pivot link, its pivotal connection to the door 13 and the guiding action of the catch assembly 61, the forward movement of the receptacle means is relatively uniform for each increment of pivotal movement of the door 13 up to the 90° horizontal position while movement of the door beyond the horizontal position to the downwardly inclined position of FIG. 3 causes a relatively smaller amount of outward movement of the receptacle means. The retaining track 34 effectively precludes undesirable forward tipping of the receptacle means up to the extreme forward position as shown in FIG. 3.

If desired, the receptacle means may be manually urged forwardly from the chamber 17 when the door is disposed in the horizontal position shown in dotted lines in FIG. 3. To preclude downward tipping of the forward end of the receptacle means when so urged outwardly from the chamber, a pair of door tracks 79 is provided on the rear of door 13 for engagement by the forward rollers 28a on the bottom of basket 26. As the roller bearings 76 are behind the flanges 77, such forward movement is permitted without interference from the mechanism provided for automatically moving the receptacle means to the accessible position.

The return of the receptacle means 25 to the fully inserted position of FIG. 2 is substantially effected by the moving of the door 13 to the vertical closed position. The invention comprehends that this be accomplished by a portion of the door structure engaging a portion of the receptacle structure. Herein tracks 79 and door 13 engage a pair of rollers in the receptacle which in the illustrated embodiment comprise returning rollers 80 carried on the bracket 33 slightly above and forward of the leading rollers 28a. Where the receptacle means 25 has been moved outwardly onto the tracks 79 it is, of course, necessary to urge the receptacle means 25 back to the partially inserted position wherein the leading rollers 28a are rearwardly of the tracks 79 so that the subsequent upward pivoting of the door 13 may engage the tracks 79 with the upper roller 80 to effect the desired rearward movement of the receptacle means to the fully inserted position of FIG. 2.

As shown in FIGS. 1 and 3, the door 13 may be provided at its upper edge with a handle 70 having a front portion defining a lower projection 71 extending substantially outwardly from the door, and an upper projection 72 extending only a small amount from the front of the door. Thus, the large projection 71 abuts the floor F in the fully downwardly pivoted position of the door, as shown in FIG. 3, with the smaller projection 72 being spaced upwardly therefrom, permitting facilitated insertion of the fingers thereunder to raise the door from the extreme position of FIG. 3.

Thus, the door 13 may be readily removably positioned in the upright closed position, the horizontal open position, a preselected position intermediate the horizontal and vertical positions, or in a fully downwardly pivoted position wherein the door rests on the floor supporting the refrigerator. The baskets provided for holding foodstuffs and the like within the freezer chamber 17 are automatically made accessible when the door is pivoted to the horizontal open position or the fully downwardly pivoted position and are automatically returned to the fully inserted position upon closing of the door, the positioning of the baskets being automatically controlled by the door movement itself. Still further, the baskets may be moved substantially fully outwardly of the chamber 17 if desired beyond the automatic accessible positioning thereof, the door being arranged to support the forward end of the lower basket in such a fully forwardly disposed arrangement. The movement of the baskets forwardly and rearwardly is facilitated by the improved roller-track arrangements and guiding means effectively precluding binding or cocking of the baskets. The means for moving the baskets forwardly to the accessible position are made separate from the means for moving the baskets rearwardly to the fully inserted position, thereby assuring trouble-free and positive movement of the baskets. The slide member carried by the upper basket is arranged for facilitated, simplified installation on the upper basket, thereby providing improved economy of construction and facilitated maintenance.

Having described our invention as related to the embodiment shown in the accompanying drawing, it is our intention that the invention be not limited by any of the details of description, unless otherwise specified, but rather be construed broadly within its spirit and scope as set out in the accompanying claims.

The embodiment of the invention in which an exclusive property or privilege is claimed is defined as follows:

1. A structure comprising: means defining a chamber having a bottom wall, opposed side walls, and a front opening; a door; means for mounting the door on the chamber means for pivotal movement about a horizontal axis selectively to a vertical closed position wherein the door closes the front opening and to any one of a plurality of open positions pivotally downwardly from the closed position including a horizontal position and an extreme position below the horizontal position; and means for releasably retaining the door in the horizontal position and permitting free movement of the door at the extreme position.

2. A structure comprising: means defining a chamber having a bottom wall, opposed side walls, and a front opening; a door; means for mounting the door on the chamber means for pivotal movement about a horizontal axis selectively to a vertical closed position wherein the door closes the front opening and to any one of a plurality of open positions pivotally downwardly from the closed position including a horizontal position and an extreme position below the horizontal position; an elongated member pivotally connected at one end to said door and extending rearwardly therefrom into said chamber, said member having a latch element thereon spaced from said one end; and catch means on the chamber means co-operating with said latch element for releasably retaining the door in the horizontal position and permitting free movement of the door at the extreme position.

3. A structure comprising: means defining a chamber having a bottom wall, opposed side walls, and a front opening; a door; means for mounting the door on the chamber means for pivotal movement about a horizontal axis selectively to a vertical closed position wherein the door closes the front opening and to any one of a plurality of open positions pivotally downwardly from the closed position including a horizontal position and an extreme position below the horizontal position; receptacle means; means movably carrying said receptacle means in said chamber for reciprocal movement forwardly and rearwardly therein; an elongated member pivotally connected at one end to said door and extending rearwardly therefrom into said chamber, said member having a latch element thereon spaced from said one end; catch means on the chamber means co-operating with said latch means for releasably retaining the door in the horizontal position; and co-operating means on the elongated member and receptacle means for moving the receptacle means outwardly to a forward position when the door is pivoted to the horizontal position.

4. A structure comprising: means defining a chamber having a bottom wall, opposed side walls, and a front opening; a door; means for mounting the door on the chamber means for pivotal movement about a horizontal axis selectively to a vertical closed position wherein the door closes the front opening and to any one of a plurality of open positions pivotally downwardly from the closed position including a horizontal position; receptacle means; means movably carrying said receptacle means in said chamber for reciprocal movement forwardly and rearwardly therein; an elongated member extending rearwardly from said door into said chamber, said member having first and second end portions, said first end portion being pivotally connected to said door; a latch element on said member intermediate said first and second ends; catch means on said chamber means co-operating with said latch element for releasably retaining said door in the horizontal position; and means on said elongated member engaging said receptacle means for moving said receptacle means outwardly from said chamber means when the door is being pivoted toward the horizontal position and said engaging means at all times being disengaged from said receptacle means when the door is pivoted toward the vertical closed position.

5. The structure of claim 4 wherein said engaging means is mounted on said second end portion of said elongated member.

6. The structure of claim 5 wherein said engaging means includes a roller bearing and said receptacle means includes a rear portion, said roller bearing selectively engaging and disengaging said rear portion.

7. A structure comprising: means defining a chamber having a bottom wall, opposed side walls, and a front opening; a door; means for mounting the door on the chamber means for pivotal movement about a horizontal axis selectively to a vertical closed position wherein the door closes the front opening and to an open position pivotally downwardly from the closed position; receptacle means; means movably carrying said receptacle means in said chamber for reciprocal movement forwardly and rearwardly therein; first co-operating means on the door and receptacle means for moving the receptacle means outwardly to a forward position when the door is pivoted to the open position; and second co-operating means on the door and receptacle means and other than said first co-operating means for moving the receptacle inwardly to a rearward position when the door is pivoted to the vertical closed position.

8. The structure of claim 7 wherein said first co-operating means is rendered ineffective to move the receptacle means when the door is being pivoted toward the vertical closed position.

9. A structure comprising: means defining a chamber having a bottom wall, opposed side walls, and a front opening; a door; means for mounting the door on the chamber means for pivotal movement about a horizontal axis selectively to a vertical closed position wherein the door closes the front opening and to any one of a plurality of open positions pivotally downwardly from the closed position including a horizontal position and an extreme position below the horizontal position; receptacle means; means movably carrying said receptacle means in said chamber for reciprocal movement forwardly and rearwardly therein; an elongated member pivotally connected at one end to said door and extending rearwardly therefrom into said chamber; first co-operating means on the elongated member and receptacle means for moving the receptacle means outwardly to a forward position when the door is pivoted to the horizontal position; and second co-operating means on the door and receptacle means for moving the receptacle inwardly to a rearward position when the door is pivoted to the vertical closed position.

10. The structure of claim 9 wherein said second co-operating means includes a track on the door for supporting the receptacle when the receptacle is urged forwardly of the position to which it is brought when the door is disposed in the extreme position.

11. The structure of claim 9 wherein said second co-operating means includes a track on the door for supporting the receptacle when the receptacle is urged forwardly of the position to which it is brought when the door is disposed in the extreme position and a reaction member on the receptacle engaged by said track when the door is moved upwardly toward the vertical position.

12. The structure of claim 9 wherein said second co-operating means includes a track on the door for supporting the receptacle when the receptacle is urged forwardly of the position to which it is brought when the door is disposed in the extreme position and a roller on the receptacle engaged by the track to roll thereon and transfer a rearward urging force to the receptacle when the door is moved upwardly toward the vertical position.

13. A structure comprising: means defining a chamber having a bottom wall, opposed side walls, and a front opening; a door; means for mounting the door on the chamber means for pivotal movement about a horizontal axis selectively to a vertical closed position wherein the door closes the front opening, and downwardly from the closed position to a horizontal position; receptacle means; means movably carrying said receptacle means in said chamber for reciprocal movement forwardly and rearwardly therein including a plurality of rollers rotatably carried by the receptacle means, means on the chamber means below said rollers for rolling engagement by said rollers, first guide means on the receptacle means, and second guide means on the chamber means for co-operation with said first guide means to preclude lateral translation of the receptacle means; first co-operating means on the door and the receptacle means for moving the receptacle means outwardly on downward movement of said door; and second co-operating means on the door and the receptacle means and other than said first co-operating means for moving the receptacle means inwardly on upward movement of said door, said guide means functioning concurrently with the functioning of each of said first co-operating means and said second co-operating means.

References Cited by the Examiner
UNITED STATES PATENTS

| Re. 21,079 | 5/39 | Cronyn et al. | 126—340 X |
| 747,685 | 12/03 | Coye | 312—330 |
| 764,777 | 7/04 | Slater | 312—311 X |
| 1,855,561 | 4/32 | Ritthaler | 126—340 |
| 1,958,348 | 5/34 | Raley | 312—337 X |
| 2,247,232 | 6/41 | Goldberg | 312—274 |
| 2,255,129 | 9/41 | Rogers | 126—340 |
| 2,398,528 | 4/46 | Hamilton | 312—330 |
| 2,657,697 | 11/53 | Walker | 312—311 |
| 2,739,025 | 3/56 | Stoddard | 312—311 |

FOREIGN PATENTS 424,796   2/35   Great Britain.

FRANK B. SHERRY, *Primary Examiner.*

CHANCELLOR E. HARRIS, *Examiner.*